United States Patent
Barnes et al.

(10) Patent No.: US 10,394,639 B2
(45) Date of Patent: Aug. 27, 2019

(54) DETECTING AND SURFACING USER INTERACTIONS

(71) Applicant: Microsoft Technology Licensing, LLC, Redmond, WA (US)

(72) Inventors: Chris Barnes, Redmond, WA (US); Nagaraju Palla, Redmond, WA (US); MadhaviLatha Kaniganti, Redmond, WA (US); Suneetha Dhulipalla, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 102 days.

(21) Appl. No.: 15/275,734

(22) Filed: Sep. 26, 2016

(65) Prior Publication Data
US 2018/0089008 A1 Mar. 29, 2018

(51) Int. Cl.
*G06F 11/00* (2006.01)
*G06F 11/07* (2006.01)
*G06F 16/2458* (2019.01)

(52) U.S. Cl.
CPC ........ *G06F 11/079* (2013.01); *G06F 11/0709* (2013.01); *G06F 11/0751* (2013.01); *G06F 11/0787* (2013.01); *G06F 16/2465* (2019.01)

(58) Field of Classification Search
CPC .. G06F 11/008; G06F 11/079; G06F 11/3409; G06F 11/3452; G06F 11/3604
USPC .......................................................... 714/37
See application file for complete search history.

(56) References Cited

U.S. PATENT DOCUMENTS

| | | | |
|---|---|---|---|
| 7,478,404 B1 | 1/2009 | Campbell | |
| 7,614,046 B2 | 11/2009 | Daniels et al. | |
| 7,783,745 B1* | 8/2010 | Bhargava | G06Q 10/06 709/224 |
| 8,296,412 B2 | 10/2012 | Secor et al. | |
| 8,301,755 B2 | 10/2012 | De Peuter et al. | |
| 8,588,078 B1 | 11/2013 | Fugate et al. | |
| 9,928,517 B1* | 3/2018 | Hitchcock | G06Q 30/0201 |
| 2003/0056140 A1* | 3/2003 | Taylor | G06F 11/0709 714/4.1 |
| 2007/0006041 A1* | 1/2007 | Brunswig | G06F 11/3688 714/38.14 |
| 2007/0101208 A1* | 5/2007 | Mohr | G06F 11/0769 714/57 |
| 2007/0165818 A1 | 7/2007 | Savoor et al. | |
| 2008/0256132 A1 | 10/2008 | Munro et al. | |
| 2012/0058757 A1 | 3/2012 | Cancer Abreu et al. | |
| 2012/0324293 A1* | 12/2012 | Grube | H04L 67/1097 714/41 |
| 2013/0176858 A1 | 7/2013 | Zee et al. | |

(Continued)

OTHER PUBLICATIONS

"Office 365 Outage Analysis for Jun. 2016", Published on: Jul. 1, 2016 Available at: https://www.exoprise.com/2016/07/01/office-365-email-outage-june-2016/.

(Continued)

*Primary Examiner* — Sarai E Butler
(74) *Attorney, Agent, or Firm* — Christopher J. Volkmann; Kelly, Holt & Christenson, PLLC

(57) ABSTRACT

Incident information that describes a timing of an incident in a service, is received from a service. User activity information is received from a client system in a tenant. An impact of an incident, on a tenant, is identified by combining the incident information with the user activity information.

20 Claims, 13 Drawing Sheets

(56) References Cited

U.S. PATENT DOCUMENTS

| | | | |
|---|---|---|---|
| 2013/0305082 A1* | 11/2013 | Draznin | H04L 65/1069 |
| | | | 714/4.1 |
| 2014/0089039 A1 | 3/2014 | McClellan | |
| 2014/0278824 A1 | 9/2014 | Kowalski et al. | |
| 2014/0297661 A1 | 10/2014 | de Assuncao et al. | |
| 2014/0358626 A1 | 12/2014 | Bardhan et al. | |
| 2015/0193720 A1 | 7/2015 | Uthra et al. | |
| 2015/0278006 A1* | 10/2015 | Iikura | G06F 11/0793 |
| | | | 714/2 |
| 2016/0125068 A1 | 5/2016 | Dongieux | |
| 2016/0378615 A1* | 12/2016 | Cohen | G06F 11/1469 |
| | | | 714/19 |

OTHER PUBLICATIONS

"Service Health and Continuity", Retrieved on: Aug. 22, 2016 Available at https://technet.microsoft.com/en-us/library/office-365-service-health.aspx.

Wills, Alan Cameron, "Application Insights—introduction", Retrieved on: Aug. 22, 2016 Available at: https://azure.microsoft.com/en-us/documentation/articles/app-insights-overview/.

"Introducing the new Office 365 Partner admin center", Published on: Jan. 28, 2014 Available at: https://blogs.office.com/2014/01/28/introducing-the-new-office-365-partner-admin-center/.

"Service Impact and Analytics", Retrieved on: Aug. 22, 2016 Available at: https://www.zenoss.com/solution/service-impact.

\* cited by examiner

DETECTING AND SURFACING USER INTERACTIONS

BACKGROUND

Computing systems are currently in wide use. Some computing systems host services in a remote server environment that are accessed by tenants. Tenants can represent an organization, a business, a portion of a business, and each tenant illustratively includes a plurality of different users, that are associated with that tenant. The users may have different permissions to access different portions of the hosted service, even within a single tenant.

In a remote server environment, such as in a cloud deployment, a given tenant may have a corresponding map. The map may identify which particular servers, server farms, or data access groups etc., that serve the tenant. In some cases, users of a tenant are also mapped to the different servers, server farms, data access groups, etc.

It is not uncommon for services to experience various incidents which may degrade or disrupt access, of the various tenants and users of the service, to the service's functionality. It can be very difficult to determine the impact of a particular incident, or a set of incidents, on a tenant, because it can be very difficult to identify which tenants were actually impacted by an incident. Thus, it can be difficult for an administrative user to determine what type of remedial action should be taken to improve the experience of the various users of a tenant, for a given service. In fact, it can even be difficult for an administrative user to determine whether any remedial action needs to be taken at all.

The discussion above is merely provided for general background information and is not intended to be used as an aid in determining the scope of the claimed subject matter.

SUMMARY

Incident information that describes a timing of an incident in a service, is received from a service. User activity information is received from a client system in a tenant. An impact of an incident, on a tenant, is identified by combining the incident information with the user activity information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
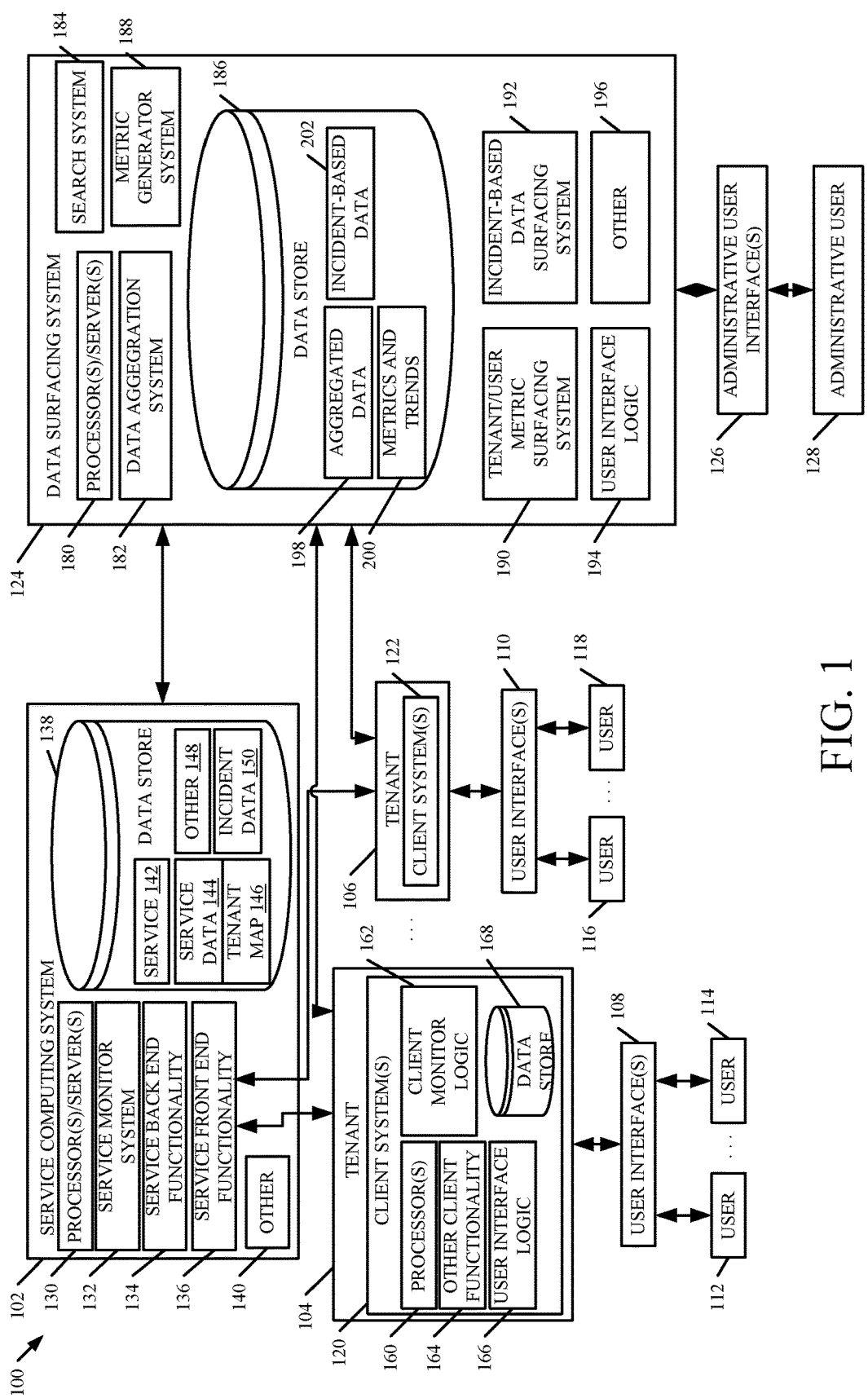
FIG. 1 is a block diagram of one example of a data detection and surfacing architecture.

FIG. 1 is a block diagram of one example of a data detection and surfacing architecture 100. Architecture 100 illustratively includes service computing system 102 that hosts a service for a plurality of tenants 104-106. FIG. 1 shows that the tenants 104-106 illustratively generate user interfaces 108-110 for interaction by users of the tenants. The users of tenant 104 are identified as users 112-114, while the users of tenant 106 are identified as users 116-118. Users 112-118 illustratively interact with user interfaces 108-110 in order to control and manipulate client systems 120-122, which are deployed on tenants 104-106, and in order to control and manipulate the service hosted by service computing system 102.

FIG. 1 also shows that, in one example, architecture 100 illustratively includes data surfacing system 124 that generates administrative user interfaces 126 for interaction by administrative user 128. User 128 illustratively interacts with interfaces 126 in order to control and manipulate data surfacing system 124.

In the example shown in FIG. 1, data surfacing system 124 illustratively obtains service data from service computing system 102, that identifies a variety of different characteristics, parameters, attributes, performance metrics, or other information related to the service hosted by service computing system 102. Data surfacing system 124 also illustratively obtains information from tenants 104-106 indicative of usage information (e.g., activity information) of the various users 112-114 and 116-118, of tenants 104-106, respectively. Data surfacing system 124 can then detect and generate a variety of different metrics, analytics, recommendations, and other information based upon the data received from service computing system 102 and tenants 104-106. It can also illustratively generate a control signal to control various items in architecture 100. For instance, it can generate a control signal that is used to display a warning, an alert, or other information on administrative user interfaces 126, for administrative user 128. It can also provide feedback signals to automatically generate messages or take other remedial action, on tenants 104-106, and within service computing system 102.

Before describing the overall operation of architecture 100 in more detail, a brief overview of some of the items in architecture 100, and their operation, will first be provided. Computing system 102 illustratively includes one or more processors or servers 130, service monitor system 132, service backend functionality 134, service frontend functionality 136, data store 138, and it can include a variety of other information 104. Data store 138 can, itself, store service 142, service data 144, one or more tenant maps 146, incident data 150 and other items 148.

Service backend functionality 134 illustratively performs backend functions in hosting the service 142 for the plurality of tenants 104-106. Service frontend functionality 136 illustratively exposes interfaces that tenants 104-106 can interact with, in order to gain access to the functionality of the hosted service 142. Frontend functionality 136 can then interact with backend functionality 134, based upon the user interactions from tenants 104-106, so that the users can perform actions, functions, or other activity within the hosted service 142 or on the service data 144. In one example, the hosted service 142 can include computing logic that is stored as service 142, in data store 138. It can also store service data 144 that is generated or manipulated by the service 142, through service backend functionality 134.

Service monitor system 132 can monitor a wide variety of different types of information regarding the service. It can monitor, for instance, which users of which tenants 104-106 are hosted on which processors or servers 130. This can be represented by tenant map 146 that is stored in data store 138. The tenant map 146 can include information such as the identity of various users for each tenant 104-106, any tags that identify particular attributes or characteristics of a user, notifications that have been sent to the various users of the various tenants, the time that those notifications have been sent, the different devices that the various users in each tenant use, metrics, which can be arranged in groups, that are to be maintained for the various tenants and various users, among a wide variety of other information.

In one example, service monitor system 132 detects and aggregates the information for tenant map 146 and incident data 150 intermittently. It can do this, for instance, based upon a pre-defined period, it can do it based upon automatic initiation of the aggregation. It can do so based upon a user input or any other detected criteria. By way of example, if service monitor system 132 detects (e.g., receives a user input or otherwise automatically detects) an incident, it may automatically begin generating incident data for that incident. The incident data may include assigning the incident a unique incident identifier, identifying the time that the incident occurred, identifying the various servers or processors 130 that are affected by the incident, a description of the incident, various remedial actions that can be taken to avert the impact of the incident, among other things.

Service monitor system 132 can also monitor a wide variety of other information, such as when incidents arise in the hosted service 142, and that information can be represented by incident data 150. One example of an incident is illustratively a problem (such as a bug, server disruption or crash, software or firmware or hardware failure, etc.) that negatively affects the performance of the hosted service 142. The incident data 150 can include information such as when the incident occurred, how long it lasted, the particular servers or processors 130 that were affected by the incident, details about what caused the incident, a description of the incident, and a wide variety of other information.

In the example shown in FIG. 1, tenants 104-106 can be different, or similar. For purposes of the present description, it will be assumed that they are similar. Therefore, only tenant 104 will be described in more detail.

In the example shown in FIG. 1, tenant 104 runs one or more client systems 120. Each client system 120 can include one or more processors or servers 160, client monitor logic 162, other client functionality 164, user interface logic 166, data store 168, etc. The client functionality 164 can be a client component of service 142, and it can include a wide variety of other functionality as well. Client monitor logic 162 illustratively monitors various things on client system 120. For instance, client monitor logic 162 can detect when a particular user 112-114 is active on the hosted service. This can be done, for instance, by detecting when the users interact with user input mechanisms displayed by the service, when the users log onto the service, when they log off, whether the service client component is running on the user's client system 120, or in a wide variety of other ways. Taking an e-mail service as an example, monitor system 132 can detect when a user is active on the e-mail system by detecting when the user has last sent an e-mail, read an e-mail, or performed other e-mail functions that generate a signal that can be monitored by client monitor logic 162. This is only one example and a wide variety of other mechanisms for detecting user activity are contemplated herein as well.

Data surfacing system 124 illustratively includes one or more processors or servers 180, data aggregation system 182, search system 184, data store 186, metric generator system 188, tenant/user metric surfacing system 190, incident-based data surfacing system 192, user interface logic 194, and it can include a wide variety of other things 196. Data aggregation system 182 illustratively aggregates the service data and tenant data received from service computing system 102 and tenant data received from tenants 104-106, and stores it in data store 186 as aggregated data 198. It can store the data by tenant, by user, by service, or in a wide variety of other ways.

Metric generator system 188 illustratively generates any desired metrics from the aggregated data 198. This can include such things as user distributions that may indicate a number or percent of active users over a certain time period that use a selected one of a variety of different products, or operating systems. It can also calculate metrics indicative of a version distribution which may indicate the number or percentage of users that use various different versions of a particular computing system (such as various different versions of an e-mail system or e-mail service, or any other service). It may calculate a metric indicative of a measure of unsupported versions that are being used by various users in architecture 100 and the number of users on each unsupported version. It may also generate metrics indicative of the number of users on different modes of a service (such as on an on-line mode or a cached mode, etc.). It may also generate metrics indicative of which types of different devices the various users have. It may calculate metrics on an individual user basis, such as which version an individual user is using. Further, it may calculate users that have various different types of tags, or it may calculate any metrics grouped by different tags. By way of example, a user may be tagged as a VIP, as holding a particular position (such as a Vice President position), or as part of another group. Thus, metric generator system 188 can generate metrics based on tag identifiers indicative of the particular tags that users are tagged with. Metric generator system 188 can also generate any given metric over a period of time, to show a trend. For instance, it can generate a metric indicative of a number of unsupported users at various dates on a timeline to show a trend indicating whether the number of unsupported users is increasing, decreasing, or staying the same. Metric generator system 188 can also generate metrics indicative of the types of notifications that are being generated by a service, which users are receiving those notifications, which tenants or tagged users are receiving those notifications, etc. These are just some examples of the different metrics that can be generated on a tenant basis, a user basis, on a device basis, based on tags, and based on notifications. It can then store this information in data store 186 (or in a different data store) as metrics and trend data 200.

Tenant/user metric surfacing system 190 then surfaces the metrics and trends 200 for viewing and interaction by administrative user 128, on an administrative user interface 126. The particular user interfaces can include a variety of different types of user interfaces, such as timelines, bar charts, pie charts, tables, lists, etc. Also, the visualizations used to represent the metrics and trends 200 can include actuatable elements that the user can actuate to modify the information being surfaced. For instance, it can include a slider to vary a parameter of the displayed data. It can include buttons, links, drill up and drill down actuators, among a wide variety of others.

Incident-based data surfacing system 192 illustratively accesses aggregated data 198 and calculates a variety of different metrics and data based on the various incidents that occur in service 142 that is hosted by service computing system 102. As mentioned above, incidents or problems can impact tenants and users in different ways. They can degrade the performance experienced by the various tenants and users. In some cases, incidents can result in disruption of the service or disconnection of various tenants or users from the service as well. In the past, when such an incident has occurred, the service computing system 102 often simply generates a notification or message indicating that an incident has occurred and performance degradation or interruption may be experienced. Administrative user 128 often has no idea what the extent of the impact will be for the particular tenants or users that the administrative user 128 is administering. Therefore, it can be difficult for administrative user 128 to determine whether remedial action is needed and, if so, what type of remedial action should be taken, and for which particular tenants or users that action should be taken.

Thus, incident-based surfacing system 192 illustratively generates metrics and generates a control signal to control surfacing of data indicative of the impact of any given incident on individual tenants 104-106 and individual users 112-118. Administrative user 128 can view and/or interact with the surfaced data. System 192 can also store the incident-based data 202 in data store 186.

Figure 2:
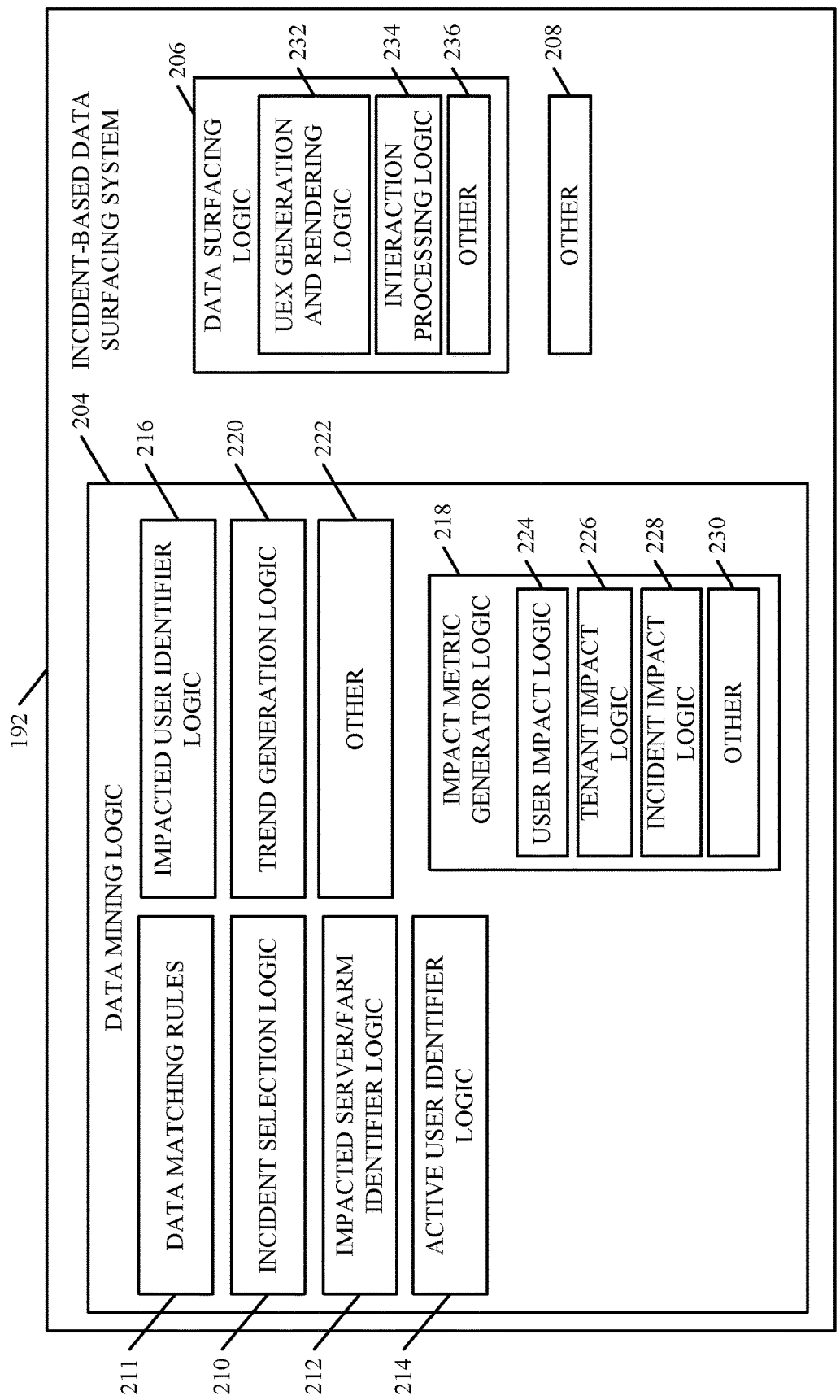
FIG. 2 is a block diagram showing one example of an incident-based data surfacing system, in more detail.

FIG. 2 is a block diagram of one example of incident-based data surfacing system 192 in more detail. In the example shown in FIG. 2, system 192 includes data mining logic 204, data surfacing logic 206, and it can include other items 208.

Data mining logic 204 illustratively mines the aggregated data 198 and it can also mine metrics and trends 200 to generate the incident-based data that will be surfaced by data surfacing logic 206. Thus, data mining logic 204 can include incident selection logic 210, data matching rules or criteria 211, impacted server/farm identifier logic 212, active user identifier logic 214, impacted user identifier logic 216, impact metric generator logic 218, trend generation logic 220, and it can include other items 222.

Incident selection logic 210 illustratively identifies various incidents that have occurred, based upon the service data received from service computing system 102 and aggregated into data store 186 as aggregated data 198. When administrative user 128 wishes to view metrics corresponding to a particular incident, incident selection logic 210 surfaces identifiers corresponding to those incidents for administrative user 128 so that the administrative user 128 can select an incident for which user 128 wishes to review metrics and other incident-based data.

Impacted server/farm identifier logic 212 can use tenant maps 146 to identify which particular servers the various tenants are on, and which of those servers have been impacted by the selected incident. Active user identifier logic 214 identifies active users, on the identified servers or farms, and impacted user identifier logic 216 can use matching rules or criteria 211 to combine the active users with the incident data to identify which of those active users were impacted by the selected incident.

Impact metric generator logic 218 can then generate a variety of different types of metrics, based upon the information identified by logic 210, 212, 214 and 216. For instance, user impact logic 224 can generate metrics based upon the particular users that were impacted. Tenant impact logic 226 can generate metrics based upon the particular tenants that were impacted. Incident impact logic 228 can generate metrics based on incidents that occurred for various tenants and users. Other items 230 can generate other impact metrics as well.

Trend generation logic 220 illustratively identifies trends from the impact metrics calculated by impact metric generator logic 218. All of this information can be stored as incident-based data 202, in data store 186.

Data surfacing logic 206 then generates one or more control signals to control user interface logic 194 to surface that data for administrative user 128. User experience (UEX) generation and rendering logic 232 illustratively surfaces a user experience that allows administrative user 128 to find, review, and in some cases interact with, the incident-based data 202. Interaction processing logic 234 illustratively detects user interactions with user actuatable input mechanisms on the surfaced data, and performs desired processing, based on those user interactions. Data surfacing logic 206 can include other items 236, which operate in other ways as well, to surface data for administrative user 128.

Figure 3A:
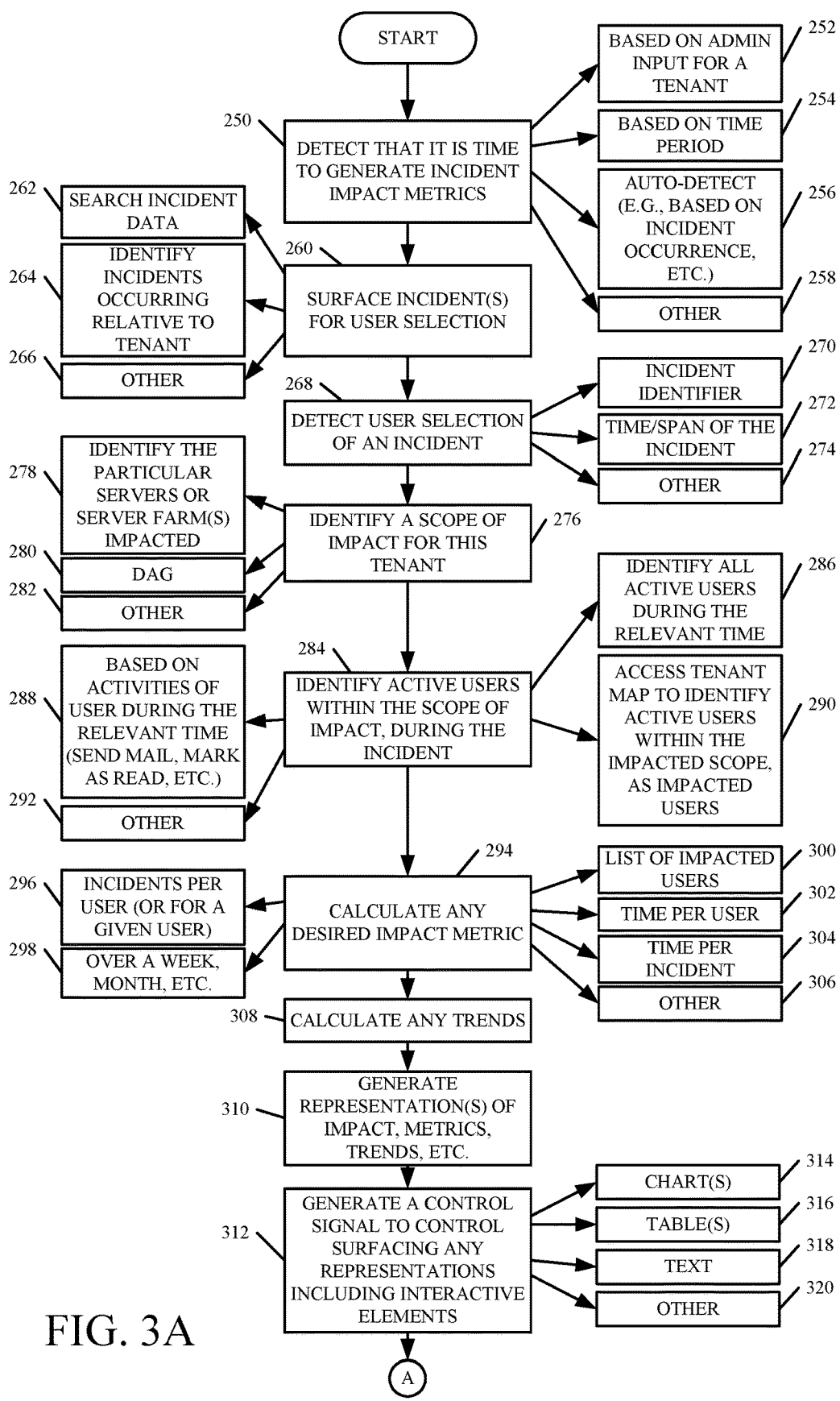
FIGS. 3A and 3B (collectively referred to herein as FIG. 3) show a flow diagram illustrating one example of the operation of the architecture shown in FIG. 1 and the system shown in FIG. 2, in detecting and surfacing one or more incident-based metrics.
Figure 3B:
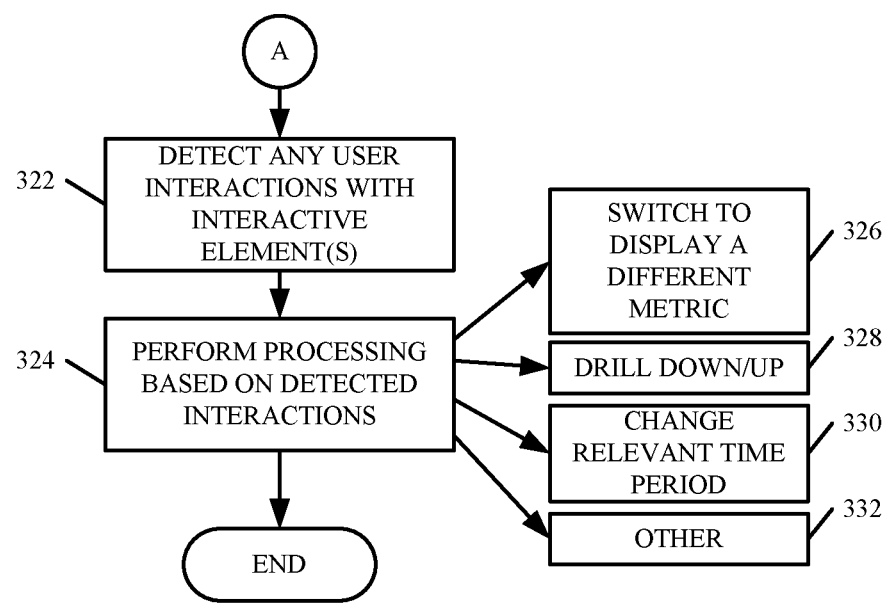

FIGS. 3A and 3B (collectively referred to herein as FIG. 3) illustrate one example of the operation of architecture 100, and incident-based data surfacing system 192, in more detail. Incident-based data surfacing system 192 first detects that it is time to generate incident impact metrics. This is indicated by block 250 in the flow diagram of FIG. 3.

For instance, administrative user 128 may provide an administrator input for a particular tenant 104-106, through an administrative user interface 126, to indicate that the administrator wishes to view incident impact metrics. This is indicated by block 253. System 192 may also be configured to intermittently generate the incident impact metrics (or incident-based data) 202 based on a particular time period. This is indicated by block 254. In another example, system 192 can automatically detect that it is time to detect such metrics and data. For instance, if a particular incident or type of incident occurs, system 192 may be configured to automatically begin calculating the incident-based data 202, for that incident, and generate a notification to administrative user 128 that the incident has occurred. This is indicated by block 256. System 192 can detect that it is time to generate incident-based data in other ways as well, and this is indicated by block 258.

Incident selection logic 210 then searches aggregated data 192 to identify and surface incidents that have occurred, so that administrative user 128 can select an incident for further processing. Surfacing incidents for user selection is indicated by block 260 in FIG. 3.

In one example, incident selection logic 210 searches aggregated data 198 for all incidents that have occurred for tenants of a particular service or set of services. This is indicated by block 262. In another example, such as where administrative user 128 is identified with or corresponds to a particular tenant or set of tenants, then incident selection logic 210 can identify incidents occurring relative to that tenant or set of tenants. This is indicated by block 264. Logic 210 can identify and surface incidents in other ways as well. This is indicated by block 266.

Administrative user 128 may then select one of the surfaced incidents, or a set of those incidents, for further processing. Incident selection logic 210 detects that the user has now selected one or more of the incidents for processing. This is indicated by block 268. The incident data for the selected incident illustratively includes an incident identifier 270 and a time at which the incident occurred, or a time span over which the incident occurred. This is indicated by block 272. It can include a wide variety of other information 274 as well.

Impacted server/farm identifier logic 212 then identifies an overall scope of the impact for a particular tenant or set of tenants. This is indicated by block 276. By way of example, it may identify the particular servers or server farms impacted by the incident. This is indicated by block 278. It may identify the particular data access groups, or other groups or logical groups, that are impacted by the incident. This is indicated by block 280. It can identify the overall scope of impact in other ways as well, and this is indicated by block 282.

Active user identifier logic 214 then identifies the active users within the scope of impact, during the incident. By combining the time that the incident occurred, with particular servers, server farms, data access groups, etc. that were affected by the incident during that time period, along with active users within that scope (e.g., active users that are served by the identified servers, server farms or data access groups), the impacted users for the particular incident can be identified. Identifying the active users within the scope of impact during the incident is indicated by block 284.

In one example, active user identifier logic 214 first identifies all active users during the relevant time period (e.g., during the time of the incident). This is indicated by block 286. This can be done based upon the activities of the various users during the relevant time period. This is indicated by block 288. For instance, if, during the relevant time period, a user attempted to send mail, mark mail as read, or otherwise interact with the service, then these types of activities will indicate that the user was active during that time period.

Once all of the active users during the relevant time period have been identified, then impacted user identifier logic 216 can use data matching rules or criteria 211 to identify which particular users were actually impacted by the incident. For instance, logic 216 can access the tenant map to identify which of those active users were within the impacted scope (e.g., which were served by the servers, data access groups, server farms, etc. that were impacted by the incident). These users will then be identified as the impacted users. They are the particular users that were active during the incident, and that were served by the impacted servers, server farms, data access groups, etc. Thus, these are the actual users that were impacted by the incident. This is indicated by block 290 in the flow diagram of FIG. 3. The active users within the scope of impact during the incident can be identified in other ways as well, and this is indicated by block 292.

Once the particular impacted users have been identified, impact metric generator logic 218 can then calculate any desired impact metrics. This is indicated by block 294. This can take a wide variety of different forms. For instance, the metrics can include a metric indicative of a number of incidents per user (for a given user or set of users). This is indicated by block 296. It can include any metric displayed over a week, over a month, or over another span of time, as indicated by block 298. It can include a list of impacted users that were impacted by various incidents, as indicated by block 300. It can include a time (such as in minutes or seconds, etc.) that various users or groups were impacted by various incidents. This is indicated by block 302. The metrics can be calculated on a per incident basis as indicated by block 304. A wide variety of other metrics can be calculated in a wide variety of other ways as well, and this is indicated by block 306.

Trend generation logic 220 can then illustratively calculate any trends. In one example, logic 220 aggregates the various metrics generated by impact metric generator logic 218 over a time period, so that this data can be surfaced to show trends, such as how those individual metrics vary over time. Calculating any trends is indicated by block 308 in the flow diagram of FIG. 3.

UEX generation and rendering logic 232 then generates representations of the impact, impact metrics, trends, or other incident-based data 202. Generating such representations is indicated by block 310. The representations may differ, depending on the particular device or client system that administrative user 128 is using to view the data. The representation may vary in a wide variety of other ways as well.

The rendering logic portion of UEX generation and rendering logic 232 then surfaces the representations for viewing by administrative user 128. It can also surface any desired interactive elements so that administrative user 128 can interact with the representations, as desired. This is indicated by block 312. Again, the representations can be rendered in a wide variety of different ways, such as using charts 314, tables 316, text 318, or a wide variety of other display elements 320.

Interaction processing logic 234 then detects any user interactions with the interactive elements that were displayed on the representations of the incident-based data. Detecting these interaction is indicated by block 322 in the flow diagram of FIG. 3.

Interaction processing logic 234 then performs any processing based on the detected interactions. This is indicated by block 324 in the flow diagram of FIG. 3. In one example, it detects the interactions and provides them to other portions of data surfacing system 124 so that processing can be performed. For instance, the interactive elements may include a button, slider, or other selection mechanism which the administrative user 128 can actuate to switch to display a different metric. This is indicated by block 326. It may include one or more interactive elements that allow administrative user 128 to drill down into more detail about the particular incident-based data being displayed, or to drill up to see more general aggregations. This is indicated by block 328. It can include interactive elements that can be actuated to change the relevant time period over which the data is calculated and displayed. This is indicated by block 330. Of course, these are examples only, and a wide variety of other interactive elements can be displayed for user interaction. This is indicated by block 332.

FIGS. 4A-4D show examples of user interface displays that can be generated and surfaced by data surfacing logic 206. Again, these are examples only and a wide variety of other representations of the data can be generated as well.

Figure 4A:
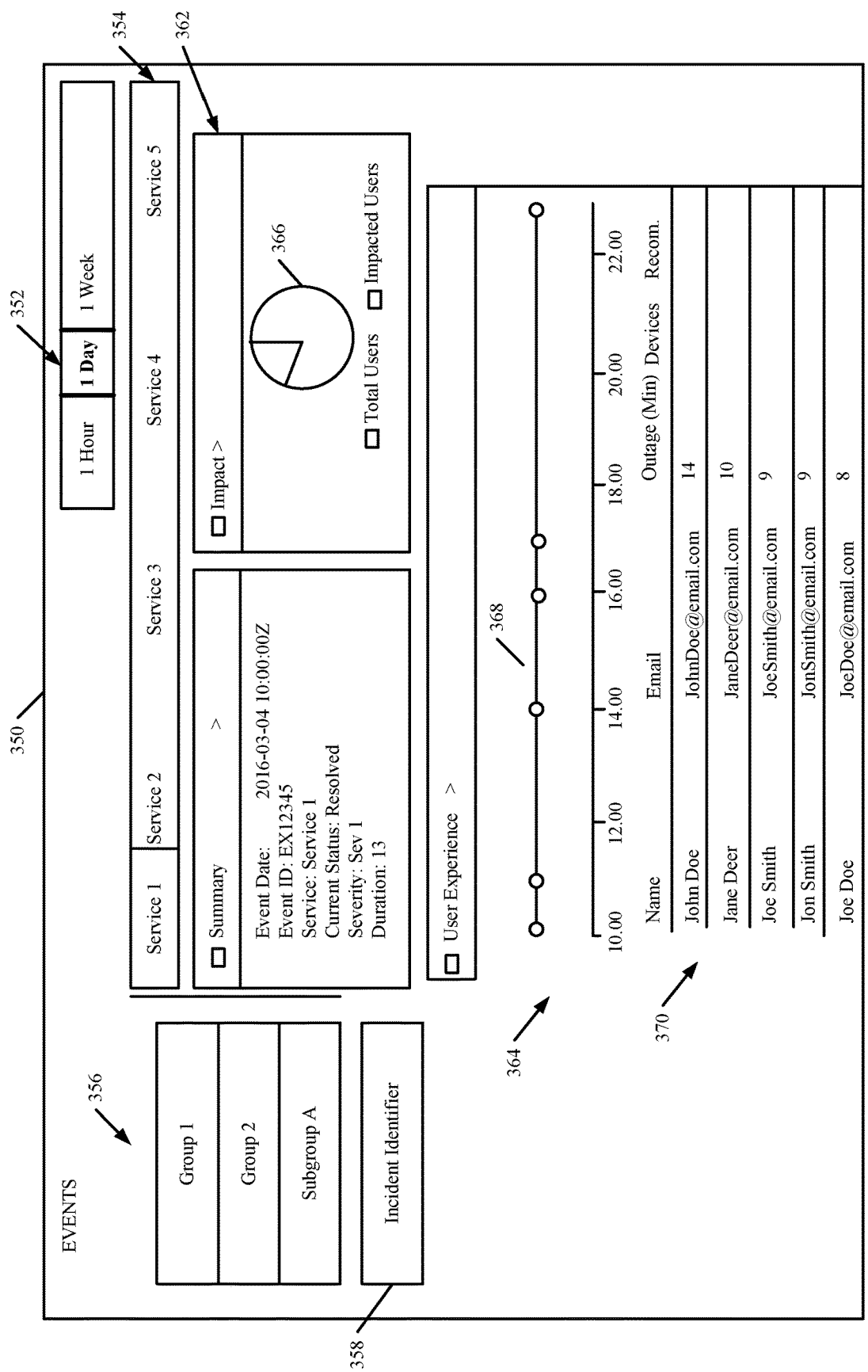
FIGS. 4A-4D show examples of user interface displays.

FIG. 4A shows one example of a user interface display 350. User interface display 350 illustratively includes a time selection user input mechanism 352, a service selection user input mechanism 354, a group selection user input mechanism 356, incident identifier 358, summary display portion 360, impact display portion 362, and user experience display portion 364. In FIG. 4A, administrative user 128 has selected a particular incident identified by incident identifier 358 and a particular group or subgroup for which data is to be displayed as indicated in the group selector 356. Administrative user 129 has also illustratively selected a particular service as indicated by the service selector 354 and a particular time span over which the data is to be aggregated and displayed as indicated by the time selection user input mechanisms 352.

Once the selections are made, summary display portion 360 illustratively displays summary information regarding the selected incident. For instance, it can include an event date (which may be a day and time) at which the incident occurred, as well as an event identifier that identifies the incident (and which can be the same as incident identifier 358, or different). It can identify the particular service that was impacted, the status of the incident (such as active, resolved, etc.) and the severity level of the incident (which may be based on the particular disruption caused by the incident, the scope of impact of the incident, etc.), along with a duration (e.g., in minutes, hours, etc.) of the incident. In the example shown in FIG. 4A, impact display portion 362 shows a pie chart 366 which shows a total number of users that are using Service 1 for a given tenant, and the impacted users that were actually impacted by the selected incident.

User experience display portion 364 illustratively includes a timeline 368 that can be used to graph a particular metric over time. It can also include a table portion 370 that identifies the particular users (and their e-mail addresses) that were impacted by the selected incident. It can include an indication of the number of minutes they were impacted by the incident, an identifier of the various devices of that user that were impacted, and any recommendations that were made to the user, during the incident.

Figure 4B:
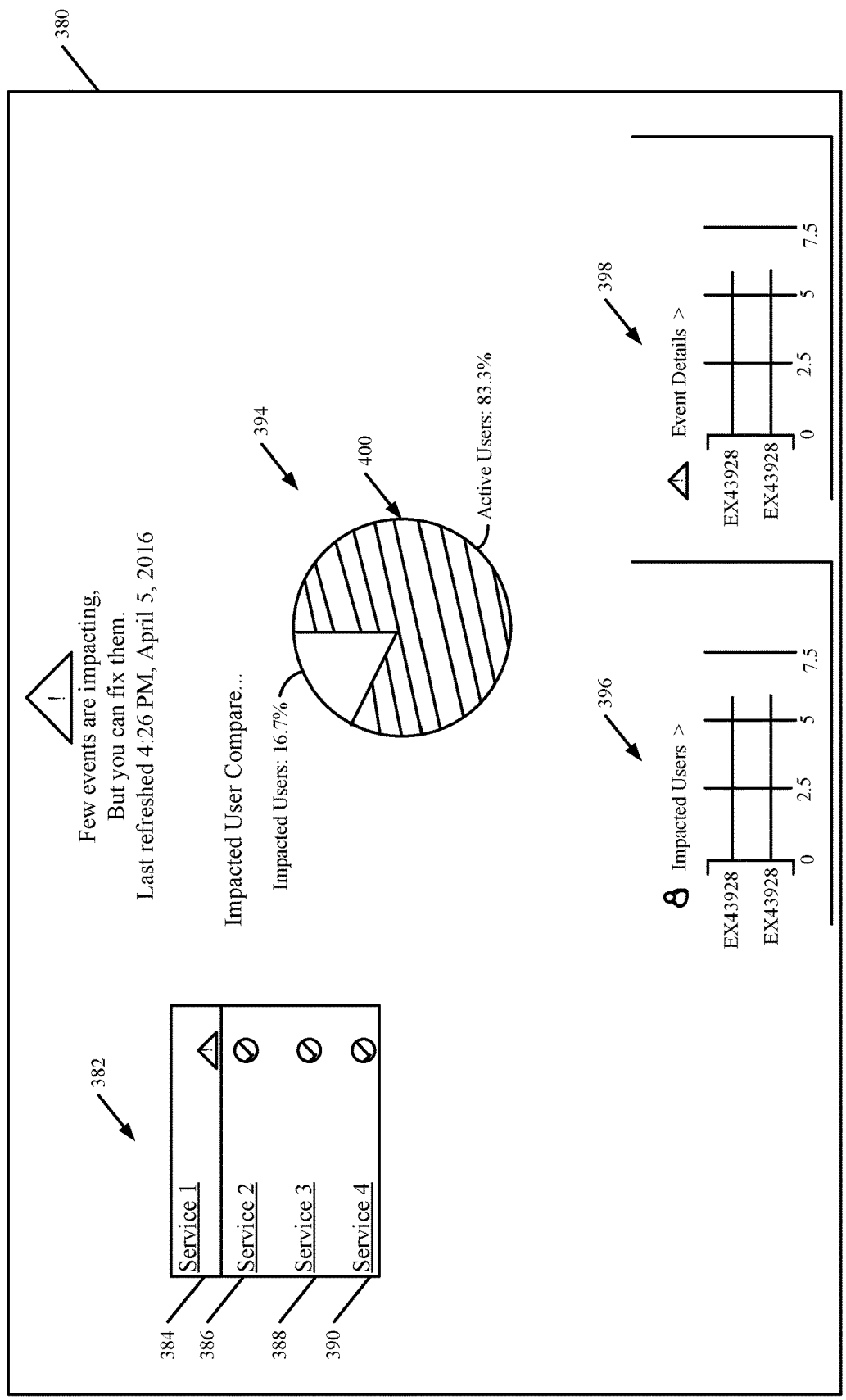

FIG. 4B shows another user interface display 380 that aggregates incident-based data for a particular service, to show a percentage of impacted users that are impacted by all of the current incidents. Display 350 illustratively includes a service selection user input mechanism 382 that allows administrative user 128 to select a particular service for which to view incident-based data. Each user actuatable element 384, 386, 388 and 390, can be actuated to select a different service. Each element 384-390 also illustratively includes a status indicator, such as indicator 392, that indicates whether there are any currently active, and unresolved, incidents for the identified service.

It can be seen that the administrative user has actuated the user actuatable element 384 for Service 1. In that case, data surfacing logic 206 surfaces an impacted user's comparison portion 394, an impacted user's detail portion 396 and an event (or incident) details portion 398. Impacted users comparison portion 394, in the example shown in FIG. 4B, includes a pie chart 400. Pie chart 400 shows total percent of active users that are impacted by the selected incident, and a percent of active users that are not impacted by the selected service. Thus, for instance, in FIG. 4B, it can be seen that, in Service 1, the percent of active users that are not impacted by any incidents is 83.3%. The percent of active users, that are impacted by all current, unresolved incidents, in aggregate, is 16.7%.

Impacted users display portion 396 can display any of a wide variety of different types of more detailed information about the particular impacted users. It can display numerical metrics calculated for those users. It can display identifying information identifying the particular users that are impacted, or it can display a wide variety of other information about the impacted users.

Event details display portion 398 can also display a wide variety of different types of more detailed information about the incidents that are currently unresolved with respect to the selected service. It can display timing information indicating how long the incident has been going on. It can display descriptive information describing the incident and what measures have been taken, and are to be taken, to resolve it. It can display an estimated resolution time indicating an estimated time when the incident will be resolved, it can provide recommendations that administrative user 128 can make to the impacted users, and it can include a wide variety of other information as well.

Figure 4C:
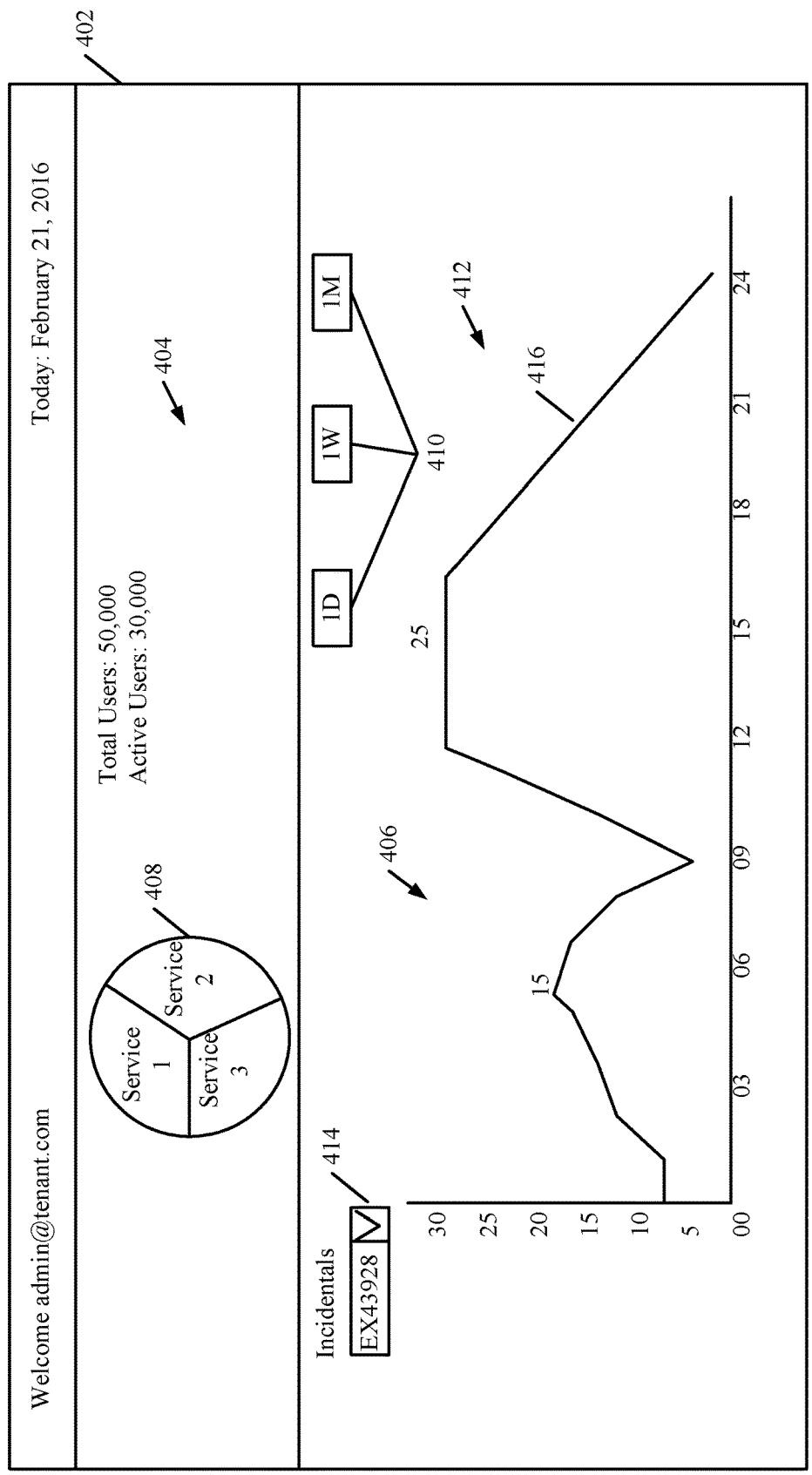

FIG. 4C shows another example of a user interface display 402. In display 402, administrative user 128 has selected an incident (such as from a drop down menu) that the administrative user is interested in. Display 402 illustratively displays a service summary portion 404, and an incident trend portion 406. The summary portion 404 may illustratively include a pie chart 408 that shows the number of active users on various services.

Incident trend portion 406 can include time selectors 410 that allow the administrative user 128 to select a time, over which trend data is to be displayed. It can then include a timeline portion 412 that graphs a metric (shown on the y axis) over the time selected by administrative user 128 (shown on the x axis). In the example shown in FIG. 4C, the metric displayed over time is the count of the number of impacted users for a particular incident selected using an incident selector drop down mechanism 414. Thus, a timeline 416 is displayed over the time period selected by the administrative user, that is indicative of the number of impacted users over that time period. Administrative user 128 can identify a trend, such as whether the number of impacted users for the incident is increasing, decreasing, staying the same, etc.

Figure 4D:
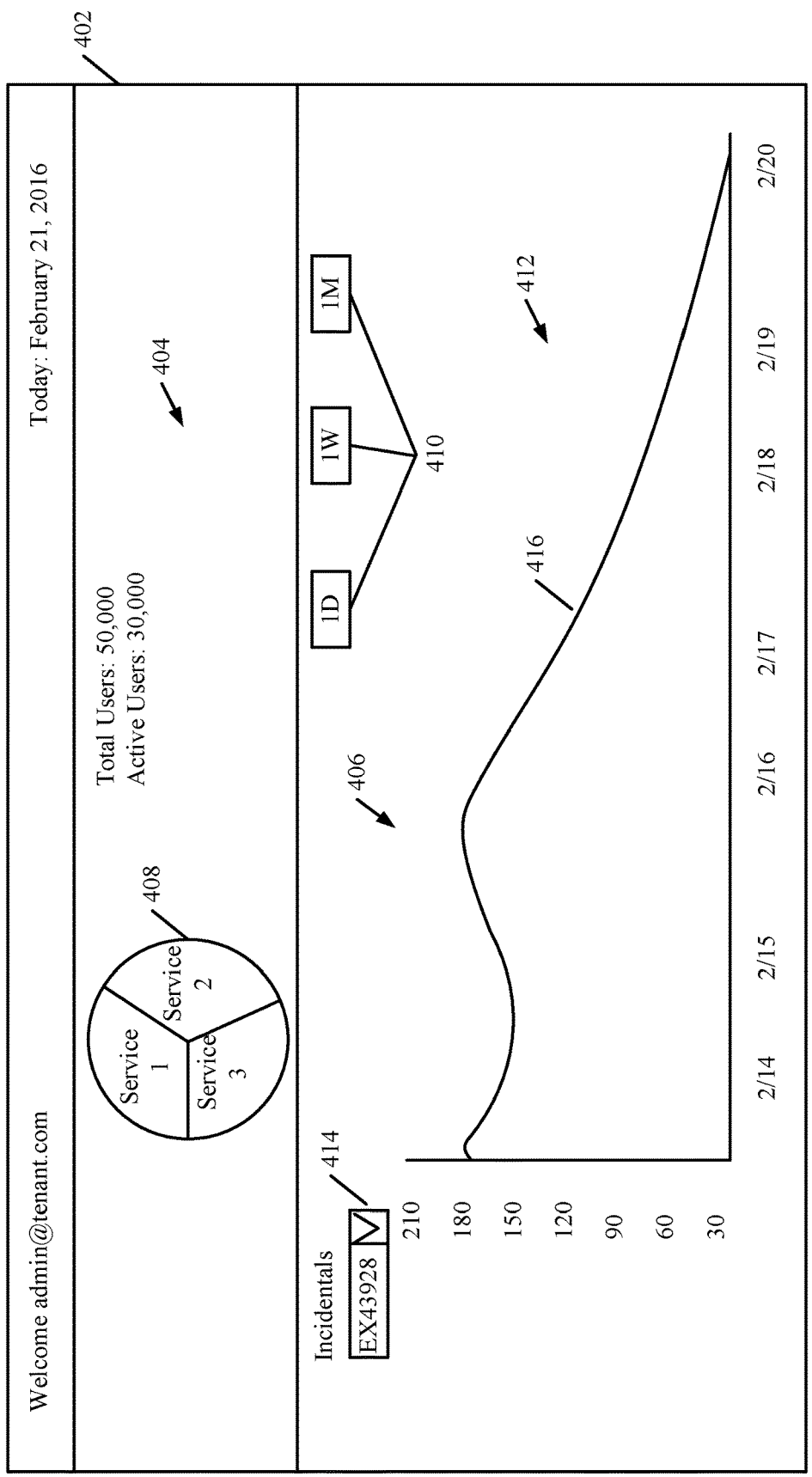

FIG. 4D shows a user interface display 402 that is similar to that shown in FIG. 4C, and similar items are similarly numbered. However, it can now be seen that in the metric trend display portion 406, the administrative user has selected the one week actuator 410 (as opposed to the one day actuator that was selected in FIG. 4C). Thus, the timeline 416 now shows the number of impacted users over a week, instead of over a day.

As discussed above, the various elements on the user interface displays can be interactive elements. For example, if administrative user 128 wishes to know who the impacted users are for a particular point in time, user 128 can select or click on a data point on the trend timeline 416. Interaction processing logic 234 (shown in FIG. 2) then navigates the user to a view which provides the e-mail addresses and identities of the users who have been impacted because of the selected incident. It can also illustratively provide possible resolutions or work-arounds that can be taken, and that can be recommended to those users.

It can thus be seen that the present system detects when incidents occur, and can automatically calculate various metrics and generate an action signal based on those metrics. The action signal can be used to control surfacing of incident-based information for user viewing and interaction. It can also, in some examples, be used to generate recommendations or work-arounds that can automatically be provided to impacted users so their systems can be modified, or so that their user experience can be changed, so they can access functionality on a service that is currently being impacted by an incident or problem.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
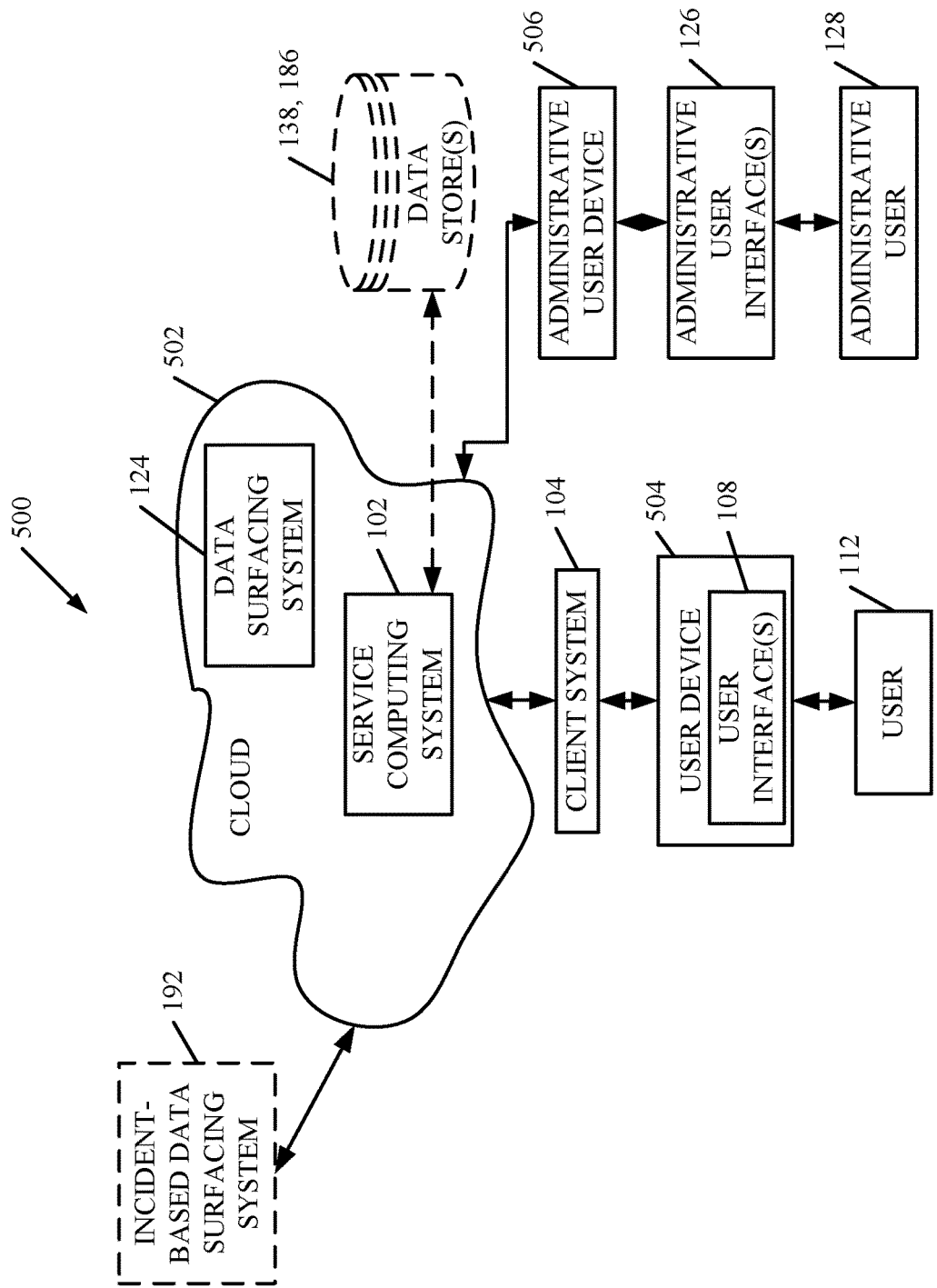
FIG. 5 shows one example of the architecture shown in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that service computing system 102 and data surfacing system 124 can be in cloud 502 (which can be public, private, or a combination where portions are public while others are private). Therefore, user 112 uses a user device 504 to access those systems through client system 104 and cloud 502. Administrative user 128 can also use a user device 506 to access systems 102 and 124.

FIG. 5 also depicts another example of a cloud architecture. FIG. 5 shows that it is also contemplated that some elements can be disposed in cloud 502 while others are not. By way of example, data stores 138, 186 can be disposed outside of cloud 502, and accessed through cloud 502. In another example, incident-based data surfacing system 108 can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
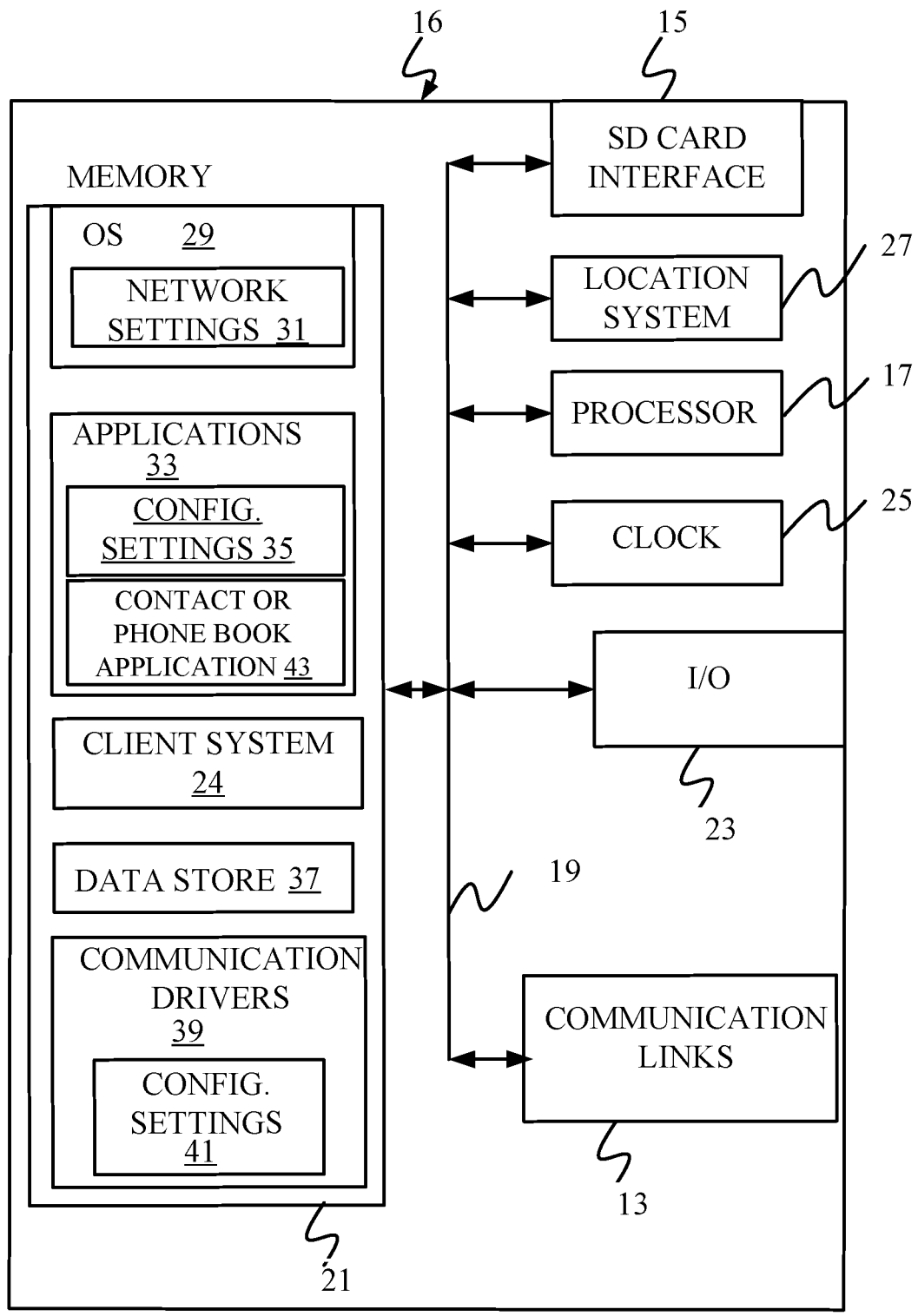
FIGS. 6-8 show examples of mobile devices that can be used in the architectures shown in the previous figures.
Figure 7:
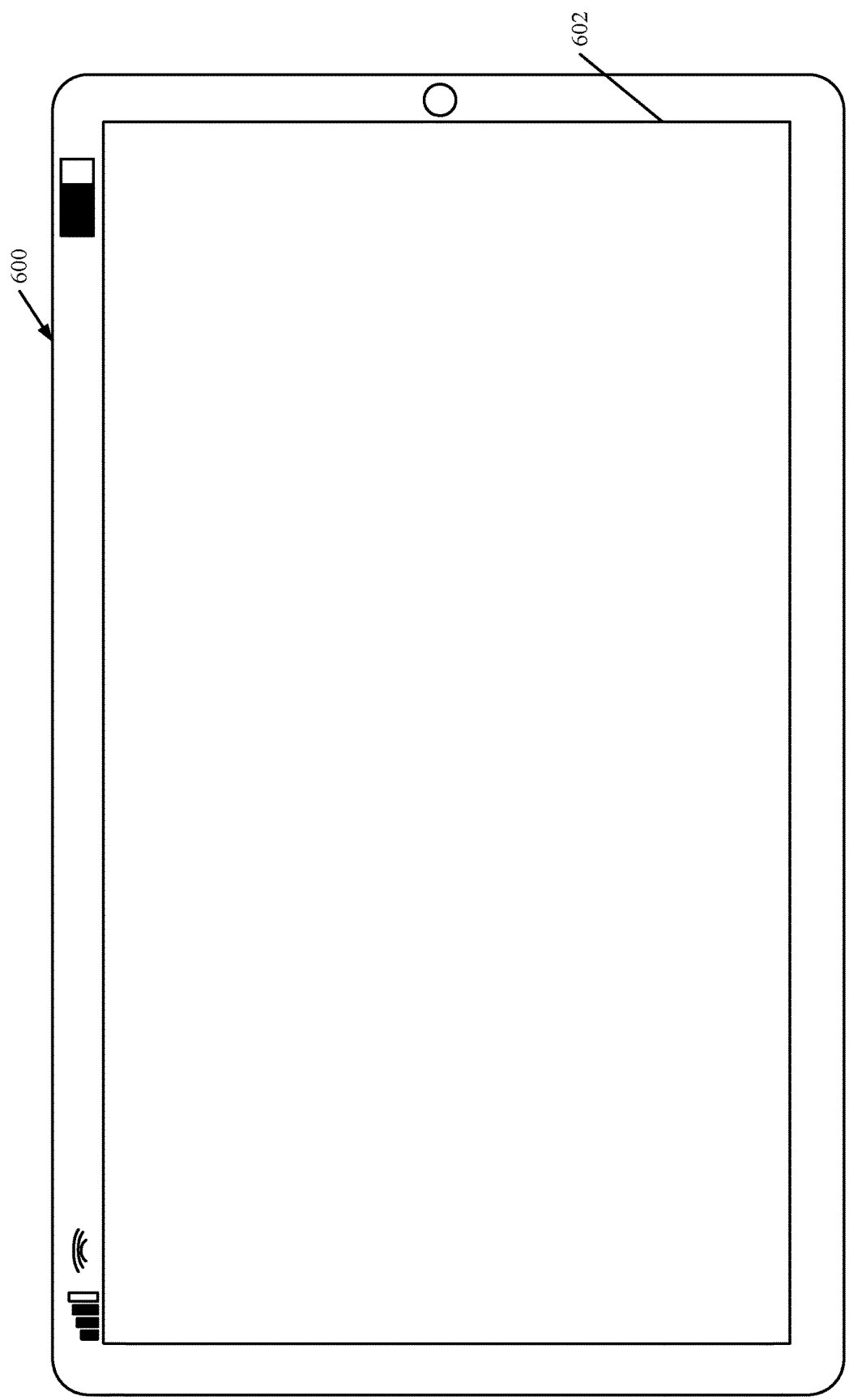
Figure 8:
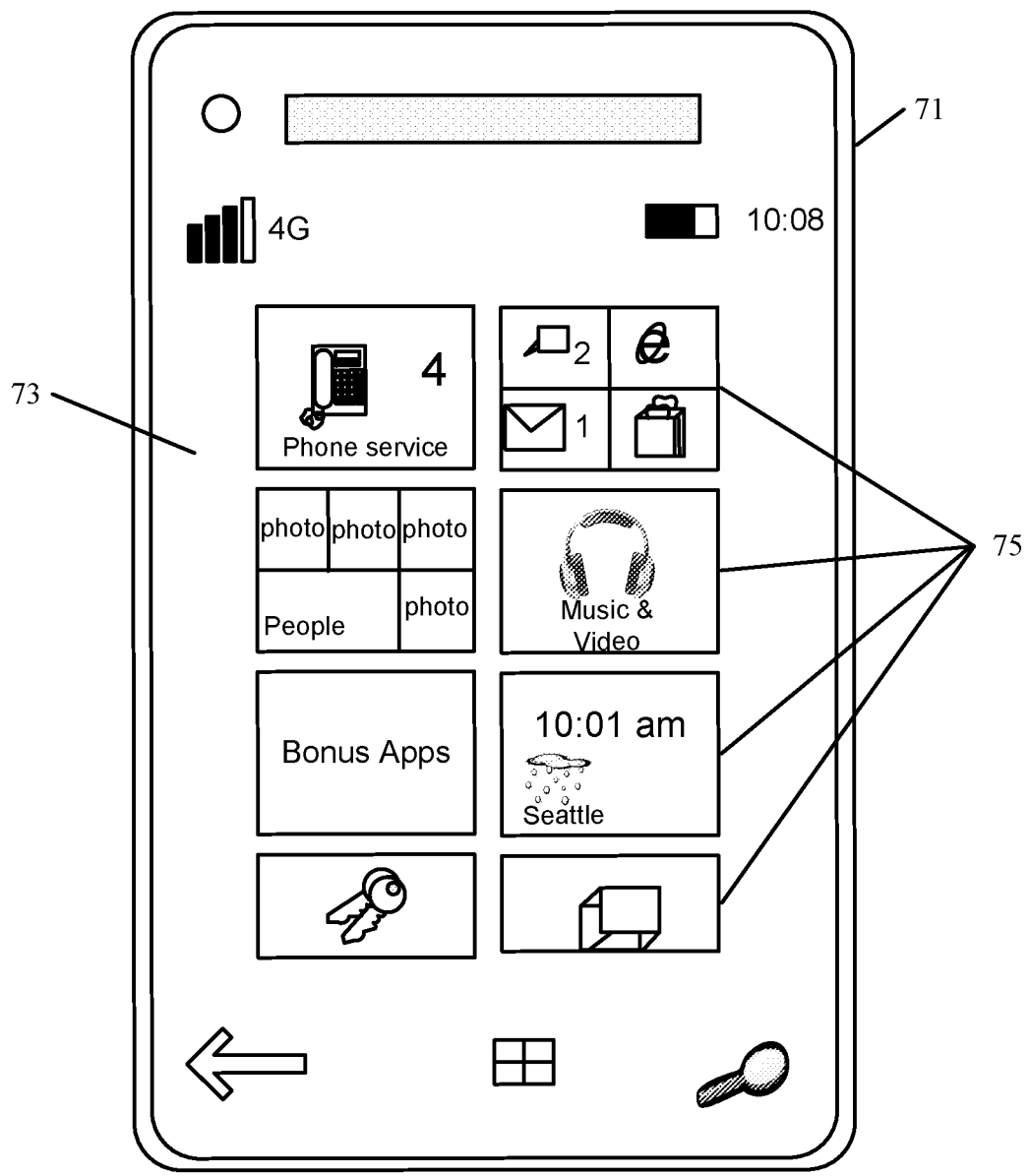

FIG. 6 is a simplified block diagram of one illustrative embodiment of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 130, 160 or 180 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various business applications or embody parts or all of tenant 104 or client system 120. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
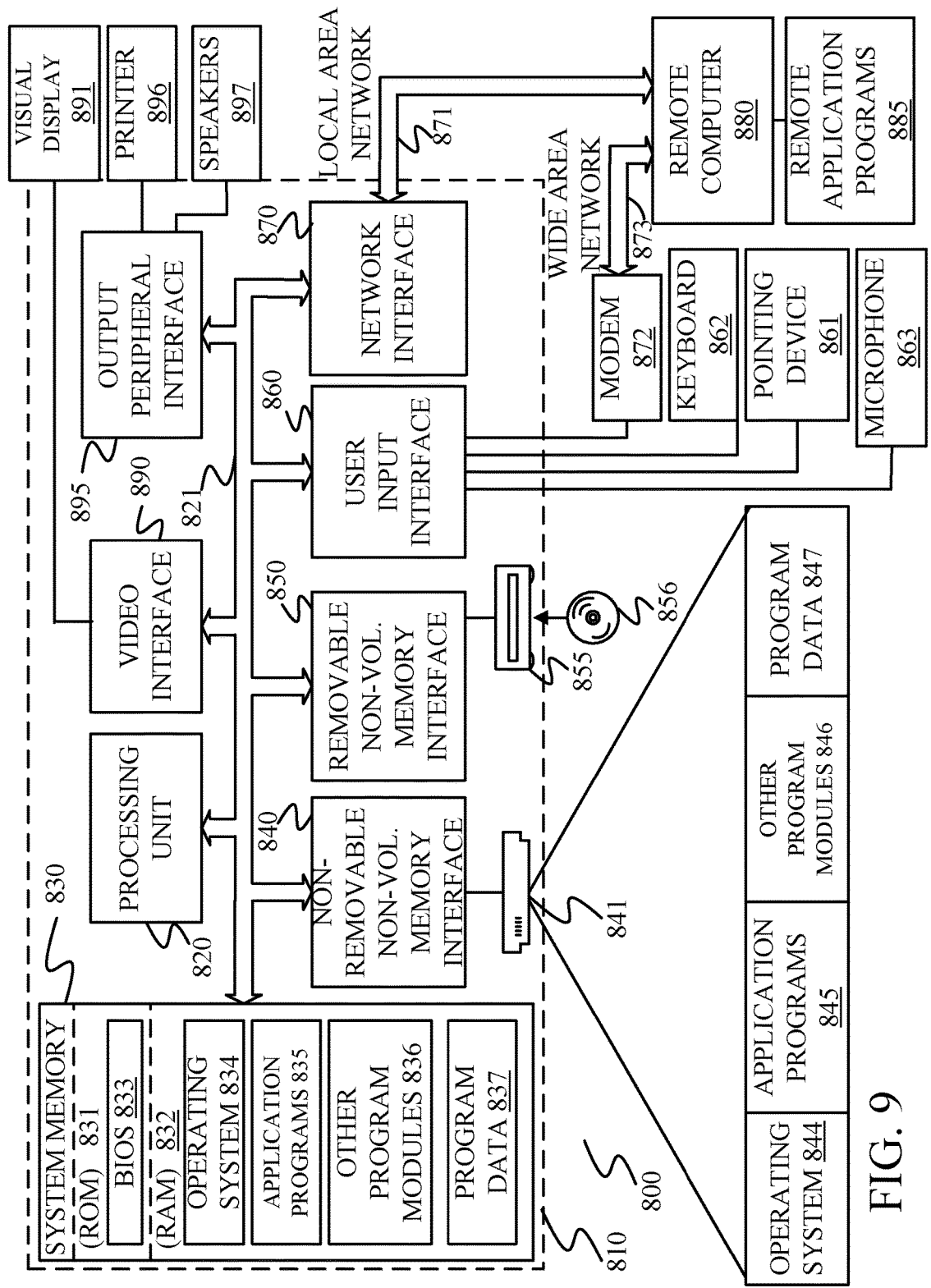
FIG. 9 is a block diagram showing one example of a computing environment that can be used in the architectures shown in the previous figures.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processor 130, 160 or 180), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

a data aggregation system that obtains incident data indicative of an incident, that results in performance degradation of a hosted service, and tenant data indicative of user activity for users of the hosted service, corresponding to a tenant;

data mining logic that accesses the incident data and the tenant data and matches the incident data to the tenant data, based on a set of data matching criteria, to identify a metric indicative of a measure of users impacted by the incident; and data surfacing logic that generates a computer control signal that controls surfacing of a representation of the identified metric, based on the identified metric.

Example 2 is the computing system of any or all previous examples wherein the data mining logic comprises:

active user identifier logic configured to identify active users of the hosted service based on the user activity indicated by the tenant data.

Example 3 is the computing system of any or all previous examples wherein the data mining logic comprises:

impacted user identifier logic configured to identify a time corresponding to the incident and identify impacted users, impacted by the incident, by combining the tenant data with the incident data to identify the active users of the hosted service who were active during the time corresponding to the incident.

Example 4 is the computing system of any or all previous examples wherein the time corresponding to the incident comprises a time span corresponding to the incident, the impacted user identifier logic being configured to identify the impacted users by combining the tenant data with the incident data to identify the active users of the hosted service who were active during the time span corresponding to the incident.

Example 5 is the computing system of any or all previous examples wherein the data mining logic comprises:

impact metric generator logic configured to generate the impact metric based on the identified impacted users.

Example 6 is the computing system of any or all previous examples wherein the data mining logic comprises:

impacted server identifier logic configured to access a tenant map and identify servers hosting the hosted service for the tenant, and to identify, based on the incident data, which of the identified servers were impacted by the incident, the impacted user identifier logic being configured to identify the impacted users based on the identified servers.

Example 7 is the computing system of any or all previous examples wherein the data mining logic comprises:

incident selection logic configured to surface an incident selection user input mechanism that is user actuatable to select the incident.

Example 8 is the computing system of any or all previous examples wherein the impact metric generator logic comprises:

user impact logic that generates the identified metric as a user metric indicative of an impact of the incident on individual users of the hosted service.

Example 9 is the computing system of any or all previous examples wherein the impact metric generator logic comprises:

tenant impact logic that generates the identified metric as a tenant metric indicative of an impact of the incident on the tenant, in terms of the impacted users of the hosted service, for the tenant, relative to all users of the hosted service, for the tenant.

Example 10 is the computing system of any or all previous examples wherein the impact metric generator logic comprises:

incident impact logic that generates the identified metric as an incident metric indicative of an impact of the incident relative to all users of the hosted service, for the tenant.

Example 11 is a computer-implemented method, comprising:

obtaining incident data indicative of an incident, that results in performance degradation of a hosted service;

obtaining tenant data indicative of user activity for users of the hosted service, corresponding to a tenant;

matching the incident data to the tenant data, based on a set of data matching criteria, to identify a metric indicative of a measure of users impacted by the incident; and generating a computer control signal that controls surfacing of a representation of the identified metric, based on the identified metric.

Example 12 is the computer-implemented method of any or all previous examples wherein matching the incident data to the tenant data comprises:

identifying active users of the hosted service based on the user activity indicated by the tenant data.

Example 13 is the computer-implemented method of any or all previous examples wherein matching the incident data to the tenant data comprises:

identifying a time corresponding to the incident; and identifying impacted users, impacted by the incident, by combining the tenant data with the incident data to identify the active users of the hosted service who were active during the time corresponding to the incident.

Example 14 is the computer implemented method of any or all previous examples wherein matching the incident data to the tenant data comprises:

accessing a tenant map; and identifying servers hosting the hosted service for the tenant, and to identify, based on the incident data, which of the identified servers were impacted by the incident, and wherein identifying impacted users comprises identifying the impacted users based on the identified servers.

Example 15 is the computer-implemented method of any or all previous examples wherein matching the incident data to the tenant data comprises:

surfacing an incident selection user input mechanism that is user actuatable to select the incident; and detecting user actuation of the incident selection user input mechanism to select the incident.

Example 16 is the computer-implemented method of any or all previous examples wherein identifying a metric comprises:

generating the identified metric as a user metric indicative of an impact of the incident on individual users of the hosted service.

Example 17 is the computer-implemented method of any or all previous examples wherein identifying a metric comprises:

generating the identified metric as a tenant metric indicative of an impact of the incident on the tenant, in terms of the impacted users of the hosted service, for the tenant, relative to all users of the hosted service, for the tenant.

Example 18 is the computer-implemented method of any or all previous examples wherein identifying a metric comprise:

generating the identified metric as an incident metric indicative of an impact of the incident relative to all users of the hosted service, for the tenant.

Example 19 is a computing system, comprising:

a data aggregation system that obtains incident data indicative of an incident, that results in performance degradation of a hosted service, and tenant data indicative of user activity for users of the hosted service, corresponding to a tenant;

active user identifier logic configured to identify active users of the hosted service based on the user activity indicated by the tenant data;

impacted user identifier logic configured to identify a time corresponding to the incident and identify impacted users, impacted by the incident, by combining the tenant data with the incident data to identify the active users of the hosted service who were active during the time corresponding to the incident;

impact metric generation logic configured to generate a metric indicative of a measure of users impacted by the incident based on the identified impacted users; and data surfacing logic that generates a computer control signal that controls surfacing of a representation of the identified metric, based on the generated metric.

Example 20 is the computing system of any or all previous examples and further comprising:

impacted server identifier logic configured to access a tenant map and identify servers hosting the hosted service for the tenant, and to identify, based on the incident data, which of the identified servers were impacted by the incident, the impacted user identifier logic being configured to identify the impacted users based on the identified servers; and incident selection logic configured to surface an incident selection user input mechanism that is user actuatable to select the incident.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   a processor; and
   memory storing instructions executable by the processor, wherein the instructions, when executed, configure the computing system to provide:

a data aggregation system configured to:
    obtain incident data indicative of an incident that results in performance degradation of a hosted service, wherein the hosted service is hosted by a service computing system and accessible by a set of users, associated with a tenant, over a computing network; and
    obtain tenant data, corresponding to the tenant, indicative of user activity for the set of users;
data mining logic configured to:
    identify, based on tenant map information corresponding to the tenant, a plurality of servers that host the hosted service for the tenant;
    identify, based on the incident data, a time corresponding to the incident and a set of servers, in the plurality of servers, that were impacted by the incident;
    identify, based on the user activity, a set of impacted users of the tenant, who were actively using the set of servers during the time corresponding to the incident;
    generate a metric indicative of a measure of the impacted users, impacted by the incident; and
data surfacing logic configured to:
    generate a computer control signal that controls surfacing of a representation of the identified metric, based on the generated metric.

2. The computing system of claim 1 wherein the service computing system comprises a multi-tenant service computing system configured to host the hosted service for a plurality of different tenants.

3. The computing system of claim 1 wherein the identified set of servers comprises some, but not all, of the plurality of servers.

4. The computing system of claim 3 wherein the time corresponding to the incident comprises a time span corresponding to the incident, the impacted user identifier logic being configured to:
    identify the impacted users by combining the tenant data with the incident data to identify active users of the hosted service who were actively using the set of servers during the time span corresponding to the incident.

5. The computing system of claim 3 wherein the data mining logic comprises:
    impact metric generator logic configured to generate the impact metric based on the identified impacted users.

6. The computing system of claim 3 wherein the data mining logic comprises:
    active user identifier logic configured to:
        receive client monitor data indicative of user activity on client devices associated with the tenant; and
        identify the active users based on the client monitor data.

7. The computing system of claim 1 wherein the data mining logic comprises:
    incident selection logic configured to surface an incident selection user input mechanism; and
    based on an indication of user actuation of the incident selection user input mechanism, select the incident.

8. The computing system of claim 5 wherein the impact metric generator logic comprises:
    user impact logic configured to generate the identified metric as a user metric indicative of an impact of the incident on individual users of the hosted service.

9. The computing system of claim 5 wherein the impact metric generator logic comprises:
    tenant impact logic configured to generate the identified metric as a tenant metric indicative of an impact of the incident on the tenant, in terms of the impacted users of the hosted service, for the tenant, relative to all users of the hosted service, for the tenant; and
    incident impact logic configured to generate the identified metric as an incident metric indicative of an impact of the incident relative to all users of the hosted service, for the tenant.

10. The computing system of claim 1, wherein surfacing the representation of the identified metric comprises generating a user interface display that displays the representation of the identified metric.

11. A computer-implemented method, comprising:
    obtaining incident data indicative of an incident, that results in performance degradation of a hosted service, wherein the hosted service is hosted by a service computing system and accessible by a set of users, associated with a tenant, over a computing network;
    based on tenant map information associated with the tenant, identifying a plurality of servers that host the hosted service for the tenant; based on the incident data, identifying a time corresponding to the incident, and identifying a set of servers, in the plurality of servers, that were impacted by the incident; and
    obtaining tenant data, corresponding to the tenant, indicative of user activity for the set of users;
    based on the user activity indicated by the tenant data, identifying a set of active users of the tenant, who were actively using the hosted service during the time corresponding to the incident;
    based on the identified set of active users and the identified set of servers, identifying impacted users, impacted by the incident;
    generate a metric indicative of a measure of the impacted users; and
    surfacing a representation of the identified metric, based on the generated metric.

12. The computer-implemented method of claim 11 wherein matching the incident data to the tenant data comprises:
    surfacing an incident selection user input mechanism that is user actuatable to select the incident; and
    detecting user actuation of the incident selection user input mechanism to select the incident.

13. The computer-implemented method of claim 12 wherein identifying a metric comprises:
    generating the identified metric as a user metric indicative of an impact of the incident on individual users of the hosted service.

14. The computer-implemented method of claim 12 wherein identifying a metric comprises:
    generating the identified metric as a tenant metric indicative of an impact of the incident on the tenant, in terms of the impacted users of the hosted service, for the tenant, relative to all users of the hosted service, for the tenant; and
    generating the identified metric as an incident metric indicative of an impact of the incident relative to all users of the hosted service, for the tenant.

15. The computer-implemented method of claim 11, wherein surfacing the representation of the identified metric comprises generating a user interface display that displays the representation of the identified metric.

16. A computing system, comprising:
    a processor; and memory storing instructions executable by the processor, wherein the instructions, when executed, configure the computing system to:
- obtain incident data indicative of an incident, that results in performance degradation of a hosted service,
  - wherein the hosted service is hosted by a multi-tenant service computing system for a plurality of different tenants, each tenant having a set of users, associated with a tenant, that access the hosted service over a computing network;
- based on tenant map information associated with a selected one of the tenants, identify a plurality of servers that host the hosted service for the selected tenant;
- based on the incident data,
  - identify a time corresponding to the incident, and
  - identify a set of servers, in the plurality of servers, that were impacted by the incident; and
- obtain tenant data indicative of user activity for the set of users associated with the selected tenant;
- identify a time corresponding to the incident;
- based on the user activity indicated by the tenant data, identify a set of active users of the selected tenant, who were actively using the hosted service during the time corresponding to the incident;
- based on the identified set of active users and the identified set of servers, identify impacted users, impacted by the incident;
- generate a metric indicative of a measure of the impacted users; and surface a representation of the identified metric, based on the generated metric.

17. The computing system of claim 16, wherein the instructions configure the computing system to:
surface an incident selection user input mechanism that is user actuatable to select the incident.

18. The computing system of claim 16, wherein the instructions configure the computing system to:
receive client monitor data indicative of user activity on client devices associated with the selected tenant; and
identify the set of active users based on the client monitor data.

19. The computing system of claim 16, wherein the time corresponding to the incident comprises a time span corresponding to the incident, and the instructions configure the computing system to:
identify the impacted users by combining the tenant data with the incident data to identify the active users associated with the selected tenant who were actively using the hosted service during the time span corresponding to the incident.

20. The computing system of claim 16, wherein the instructions configure the computing system to:
generate a tenant metric indicative of an impact of the incident on the selected tenant, in terms of the impacted, users of the hosted service, for the selected tenant, relative to all users of the hosted service, for the selected tenant; and
generate an incident metric indicative of an impact of the incident relative to all users of the hosted service, for the selected tenant.

* * * * *